United States Patent [19]

Staudinger et al.

[11] 4,159,748

[45] Jul. 3, 1979

[54] WEIGHING SCALE

[75] Inventors: Frederick J. Staudinger, North Salem, N.Y.; Paul M. Kasarauskas, Stamford, Conn.

[73] Assignee: Pitney-Bowes, Inc., Stamford, Conn.

[21] Appl. No.: 859,864

[22] Filed: Dec. 12, 1977

[51] Int. Cl.² .............................................. G01G 3/02
[52] U.S. Cl. .............................. 177/225; 177/DIG. 9
[58] Field of Search ................. 177/DIG. 9, 225, 230, 177/231, 232, 168-170

[56] References Cited

U.S. PATENT DOCUMENTS

| | | | |
|---|---|---|---|
| 3,698,496 | 10/1972 | Lohmann | 177/230 |
| 3,734,218 | 5/1973 | Kupper | 177/255 X |

FOREIGN PATENT DOCUMENTS 260707 11/1926 United Kingdom ..................... 177/168

Primary Examiner—Joseph W. Hartary
Attorney, Agent, or Firm—Peter Vrahotes; William D. Soltow, Jr.; Albert W. Scribner

[57] ABSTRACT

An improved weighing scale has spring hangers comprising flexure pivots. When the load to be weighed is applied to the coil spring of the scale, the spring tends to uncoil. The flexure pivot spring hangers allow the coil spring to unwind, thus providing the load support to obtain a linear deflection characteristic throughout the weighing range. The flexure pivot spring hangers can comprise either a flexible thin strip member or a flexible wire. The thin strip may be necked about its mid-portion to provide additional flexibility.

4 Claims, 6 Drawing Figures

WEIGHING SCALE

The invention pertains to improvements in weighing scales, and more particularly to improved spring hangers for suspending the scale main springs.

BACKGROUND OF THE INVENTION

There are two basic types of spring hangers that are presently in normal use in scales. A first one of these, uses a knife edge pivot comprising a hardened pin located in a "V"-groove. This arrangement results in a linear load deflection characteristic for the load support, but this type of hanger does not provide repeatable results. Its repeatability varies as a function of the scale loading rate, which makes this hanger unacceptable under conditions of actual use.

A second hanger device is comprised of rigidly fixed members that do not allow or permit the spring to unwind during extension. this rigidity causes the spring to distort about its longitudinal axis as the movable end of the spring traverses through its arc of motion. This of course will result in gross non-linearities in the load deflection characteristic.

The present invention is concerned with a spring hanger design that will allow the load support spring to uncoil during its extension.

The invention is also interested in maintaining the longitudinal axis of the spring in a straight line to prevent distortion.

SUMMARY OF THE INVENTION

The invention relates to a suspension apparatus for a weighing scale. The suspension apparatus comprises a movable load support that deflects in response to a load being weighed. A coil spring supports the load for deflection through a weighing range. The coil spring is carried by the frame of the scale. A pair of spring hangers connects the coil spring to the frame and the load support respectively. The hangers comprise a flexure pivot consisting of a torsion-free member whose ends are fixedly restrained. Because of the flexure pivot spring hangers, the coil spring will be free to uncoil when the load support deflects. This will provide a repeatable linear deflection characteristic for the load support. This will insure that the weight readings will be more accurate, since they depend upon deflection of the spring. In addition, the present invention eliminates non-linearities in the coil spring due to distortion of the spring axis.

It is an object of this invention to provide an improved spring suspension apparatus for a weighing scale;

It is another object of the invention to provide an improved spring hanger that allows the load support spring of a scale to uncoil during its extension;

These and other objects of this invention will become more apparent and will be better understood with reference to the following detailed description taken in conjunction with the accompanying drawings, in which:

FIG. 3b is a perspective view of a second embodiment of the spring hanger illustrated in FIG. 3a; and FIG. 3c is a perspective view of a third embodiment of the spring hanger depicted in FIG. 3a.

DETAILED DESCRIPTION.

Figure 1:
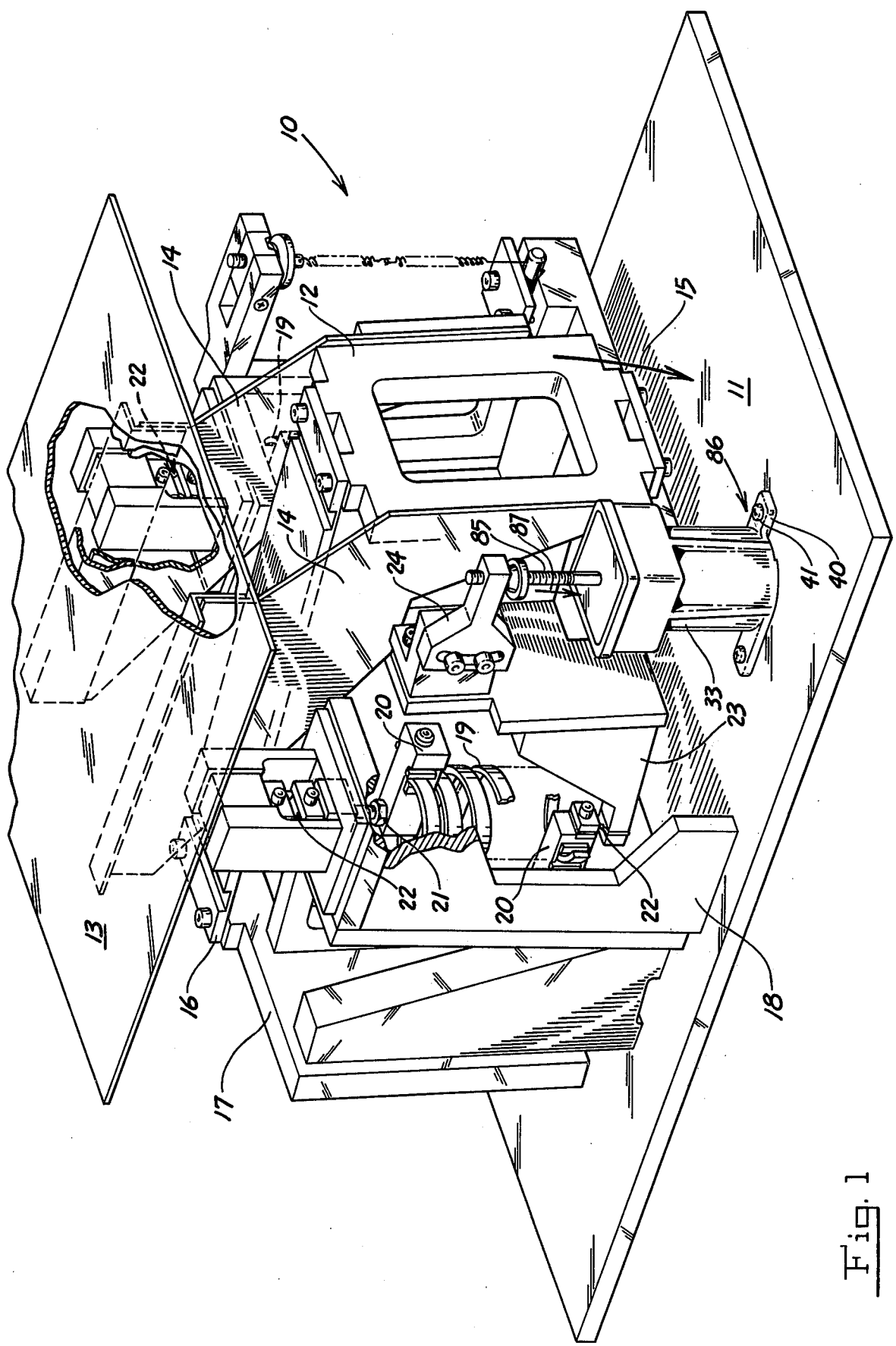
FIG. 1 is a perspective view of a weighing scale using the inventive suspension apparatus.

Referring to FIG. 1, a Weighing scale 10 containing the invention is illustrated. The scale 10 comprises a frame or base 11 for supporting a deflective load support structure 12. A weighing platform or pan 13 is connected to the load support 12 via brackets 14. The load support 12 will deflect (arrow 15) in response to a load being weighed (placed upon pan 13). The load support is fixed at one end 16 to vertical wall 17. The load support 12 deflects (arrow 15) about its other end in an arcuate motion.

A vertical frame support 18 carries a coil spring 19 via a clamping device 20 and a suspension apparatus 21. The suspension apparatus 21 contains a flexible, torsion-free, flexure pivot 22, which is the subject of the present invention.

Another clamp 20 and flexure pivot 22 suspends and connects the lower end of the coil spring 19 to the deflectable load support 12 via flange 23.

There are two coil springs 19, one on each side, as shown. This duplicate is for the purpose of balancing the scale forces.

Figure 2A:
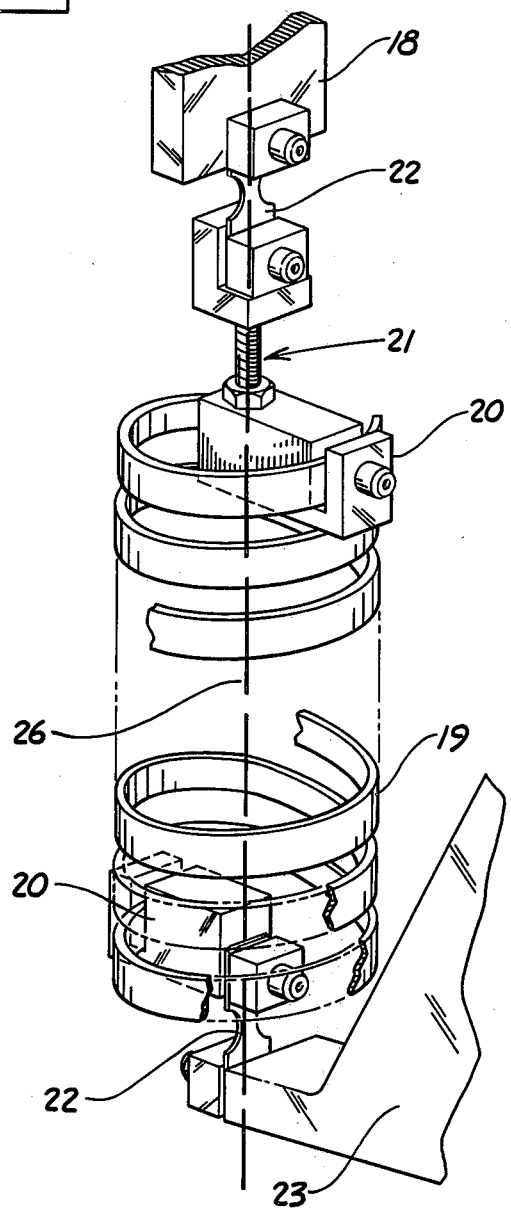
FIG. 2a is a perspective view of the suspension apparatus of this invention illustrated in a non-extended position.
Figure 2B:
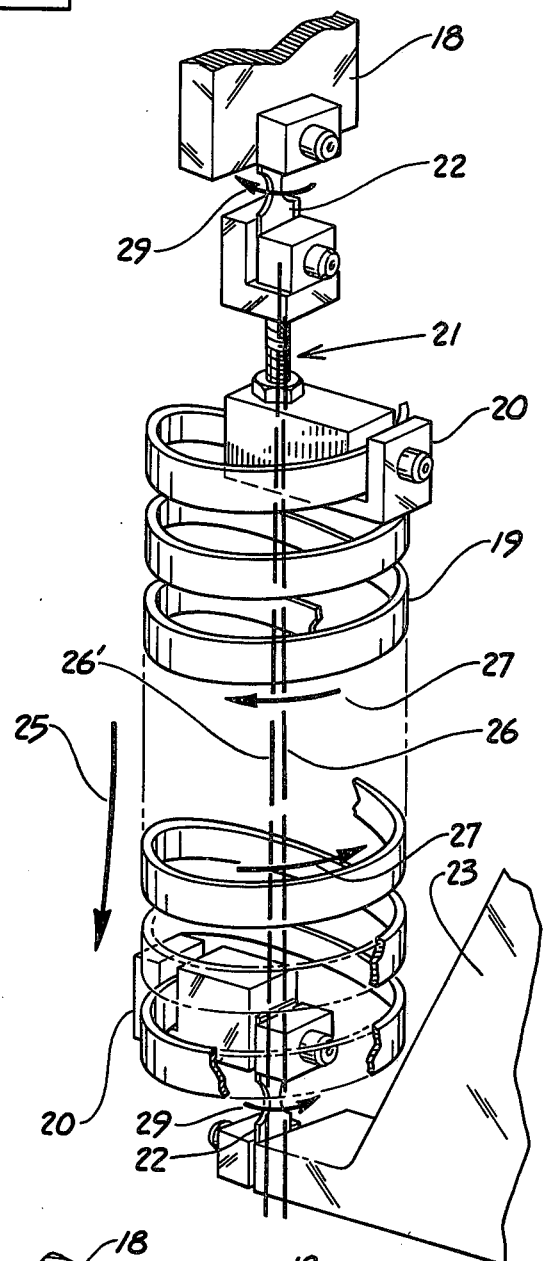
FIG. 2b is a perspective view of the suspension apparatus of this invention depicted in an extended position.

Now referring to FIGS. 2a and 2b, the coil spring 19, the clamps 20, and the suspension apparatus 21 are shown in greater detail. FIG. 2a depicts the spring 19 in an initial unextended position, and FIG. 2b illustrates the coil spring 19 in an extended position (arrow 25). Note, that arrow 25 is curved to illustrate the arcuate motion transmitted from the load support 12 via flange 23 (FIG. 1) to the coil spring 19.

When the load support 12 deflects, two changes take place in the coil spring 19.

(a) the spring 19 is caused to shift from the vertical axis 26 (FIG. 2a), to axis 26' (FIG. 2b) in response to the arcuate movement of the deflected load support 12. In prior art scales, this shifting causes the spring 19 to distort. In the present invention, the off-line forces are absorbed by the flexure pivots 22 on each end of the spring 19. These flexure pivots are free to bend, flex, or twist to absorb the stresses which would normally be carried by springs 19 during extension. Thus spring 19 although off-line from axis 26 will nevertheless remain in a straight line.

(b) the spring 19 is also caused to unwind (uncoil) when it is stretched or extended as shown schematically by arrows 27 (FIG. 2a). In prior art devices this uncoiling could not always take place due to the rigidity of the suspension apparatus. As a result, the deflection linearity of spring 19, and hence, the load support 12 would be impaired.

The present inventive flexure pivots 22, however, are free to twist (arrows 29) (are torsion-free), and therefore, will allow the springs 19 to uncoil. Therefore, the load support 12 will maintain its linear deflection characteristics with respect to the load being weighed.

Figure 3B:
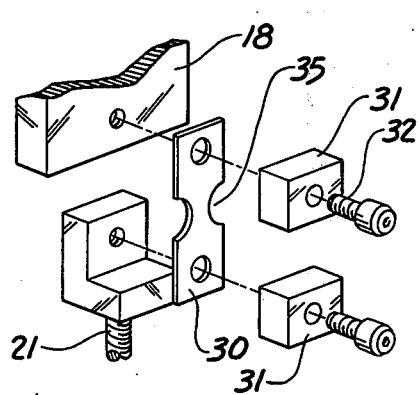
Figure 3A:
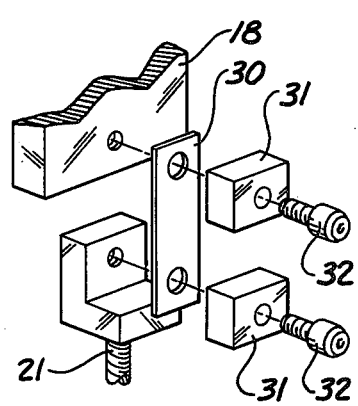
FIG. 3a is a perspective view of one embodiment of the spring hanger for the suspension apparatus shown in FIGS. 2a and 2b.
Figure 3C:
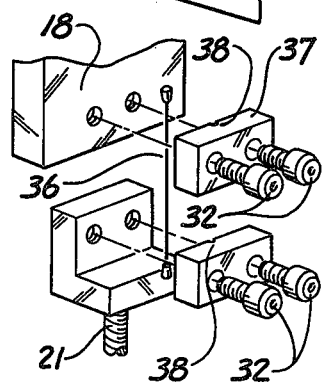

Referring to FIGS. 3a, 3b, and 3c, three embodiments are shown for the flexure pivots 22. FIG. 3a depicts a thin flexible plate 30, which is fixedly restrained at each end by clamps 31 via screws 32. More flexibility can be achieved, however, by necking the mid-portion of the flexure pivot as shown by arrow 35 in FIG. 3b. Plate 30 can, however, be replaced by a wire 36, which can be clamped by two blocks 37 containing a groove 38. Four screws 32 are used to fixed fasten the ends of the wire 36, as shown.

In summary, the flexure pivots 22 absorb the misalignments, stresses, and strains in the coil springs 19, such that the linearity characteristics of the springs 19, and hence, the load support 12 are retained, with respect to the load being weighed.

Having described the invention, what is desired to be protected by Letters Patent is presented by the appended claims.

What is claimed is:

1. A suspension apparatus for a Weighing scale, comprising:
    a movable load support that deflects in response to a load being weighed;
    a coil spring for supporting said load support for deflection through a given weighing range;
    a frame for carrying said coil spring; and
    a pair of spring hangers, one hanger of said pair connecting said spring to said frame, and the other hanger of said pair connecting said spring to said load support, each hanger of said pair comprising a flexure pivot consisting of a torsion-free member whose ends are fixedly restrained, whereby as said load support deflects in response to said load, said coil spring is free to uncoil such that the load support will obtain a linear deflection characteristic with respect to the load being weighed.

2. The suspension apparatus of claim 1, wherein said flexure pivot comprises a flexible thin strap member.

3. The suspension apparatus of claim 2, wherein said thin strap member has a necked portion at a mid-section thereof.

4. The suspension apparatus of claim 1, wherein said flexure pivot comprises a thin flexible wire.

* * * * *